(12) United States Patent
Lin et al.

(10) Patent No.: US 6,874,069 B2
(45) Date of Patent: Mar. 29, 2005

(54) MICROCONTROLLER HAVING AN EMBEDDED NON-VOLATILE MEMORY ARRAY WITH READ PROTECTION FOR THE ARRAY OR PORTIONS THEREOF

(75) Inventors: Fong-Long Lin, Fremont, CA (US); Xiangyang Teng, Beijing (CN)

(73) Assignee: Silicon Storage Technology, Inc., Sunnyvale, CA (US)

( * ) Notice: Subject to any disclaimer, the term of this patent is extended or adjusted under 35 U.S.C. 154(b) by 264 days.

(21) Appl. No.: 10/206,635

(22) Filed: Jul. 26, 2002

(65) Prior Publication Data

US 2004/0019754 A1 Jan. 29, 2004

(51) Int. Cl.⁷ ............................................. G06F 12/14
(52) U.S. Cl. ....................... 711/156; 711/163; 711/103; 711/152; 365/185.04; 365/185.33; 713/200; 326/8
(58) Field of Search ................................. 711/156, 163, 711/103, 152; 713/200; 326/8; 365/185.33, 185.04, 189.02, 195; 712/37, 225, 229; 710/36, 200; 717/168, 174

(56) References Cited

U.S. PATENT DOCUMENTS

| | | | | |
|---|---|---|---|---|
| 5,506,806 A | * | 4/1996 | Fukushima | .................. 365/195 |
| 5,930,826 A | * | 7/1999 | Lee et al. | .................... 711/163 |
| 5,974,500 A | * | 10/1999 | Maletsky et al. | ........... 711/103 |
| 6,026,016 A | * | 2/2000 | Gafken | .................. 365/185.04 |
| 2003/0135706 A1 | | 7/2003 | Lin | |

* cited by examiner

Primary Examiner—Denise Tran
(74) Attorney, Agent, or Firm—DLA Piper Rudnick Gray Cary US LLP

(57) ABSTRACT

A single integrated circuit microcontroller 10 includes an embedded erasable/programmable non-volatile memory 12 having a read protection capability. Microcontroller 10 can operate within a special mode in which external circuits may access memory 12 by use of input/output pins 18. When microcontroller 10 activates this special mode, a read protection flag 13 within memory 12 is checked. The read protection flag 13 may be set during production of the microcontroller 10 after instructional data or firmware has been installed onto memory 12. If the read protection flag 13 has been set, only certain portions of the memory 12 may be read, depending upon the value of the read protection flag 13.

11 Claims, 2 Drawing Sheets

MICROCONTROLLER HAVING AN EMBEDDED NON-VOLATILE MEMORY ARRAY WITH READ PROTECTION FOR THE ARRAY OR PORTIONS THEREOF

FIELD OF THE INVENTION

The present invention generally relates to an integrated microcontroller, and more particularly to a microcontroller having an embedded non-volatile memory array with read protection for the array or portions thereof, which prevents read access to the protected portion of embedded non-volatile memory array by external access.

BACKGROUND OF THE INVENTION

A microcontroller is an integrated circuit that may be used in a wide variety of applications, and typically includes a processor or control unit, input/output units, and embedded memory, such as random access memory ("RAM") and read only memory ("ROM").

One type of microcontroller further includes embedded erasable/programmable non-volatile memory, such as flash memory. This type of microcontroller is typically designed to execute only internal memory instructions (i.e., instructions originating from inside the microcontroller) on the embedded non-volatile memory. In this type of microcontroller, no address or data signals, or only partial address/data signals, can be monitored from outside the device. Therefore, internal memory operations cannot be monitored from outside the microcontroller.

In order to program instructional data or firmware onto the embedded non-volatile memory of this type of microcontroller during production, a special mode is created that allows data to be multiplexed onto the embedded non-volatile memory from one or more input/output pins. The special mode is typically activated by communicating a predetermined sequence of signals to the input/output pins.

While this special mode allows firmware to be efficiently installed within the microcontroller, it also will allow external circuits to read back the contents of the non-volatile memory. Hence, the firmware stored within the non-volatile memory could potentially be read out and duplicated by an unauthorized party accessing the special mode.

It is therefore desirable to provide a microcontroller having embedded erasable/programmable non-volatile memory which overcomes the foregoing drawbacks of prior microcontrollers and which has the ability to prevent access to data stored within the embedded non-volatile memory while the microcontroller is operating in a special mode.

In U.S. patent application Ser. No. 10/052,327 filed on Jan. 17, 2002, a microcontroller is disclosed as having an embedded erasable/programmable non-volatile memory. A read protection flag is stored in the memory. When the special mode is activated and an external read operation commences, and if the read protection flag is set, the entire memory is erased, thereby thwarting any access of the content of the memory in the external read mode.

SUMMARY OF THE INVENTION

According to one aspect of the present invention, a single integrated circuit microcontroller having embedded non-volatile memory with read protection is provided. The microcontroller includes an erasable/programmable non-volatile memory unit; a read protection flag stored within the microcontroller; and a logic portion which is adapted to detect when a special mode is activated, to check the read protection flag upon detecting the special mode, and to allow external access to only a portion of the non-volatile memory unit in response to the value of the read protection flag.

These and other features, advantages, and objects of the invention will become apparent by reference to the following specification and by reference to the following drawings.

DETAILED DESCRIPTION OF THE PREFERRED EMBODIMENT OF THE INVENTION

Figure 1:
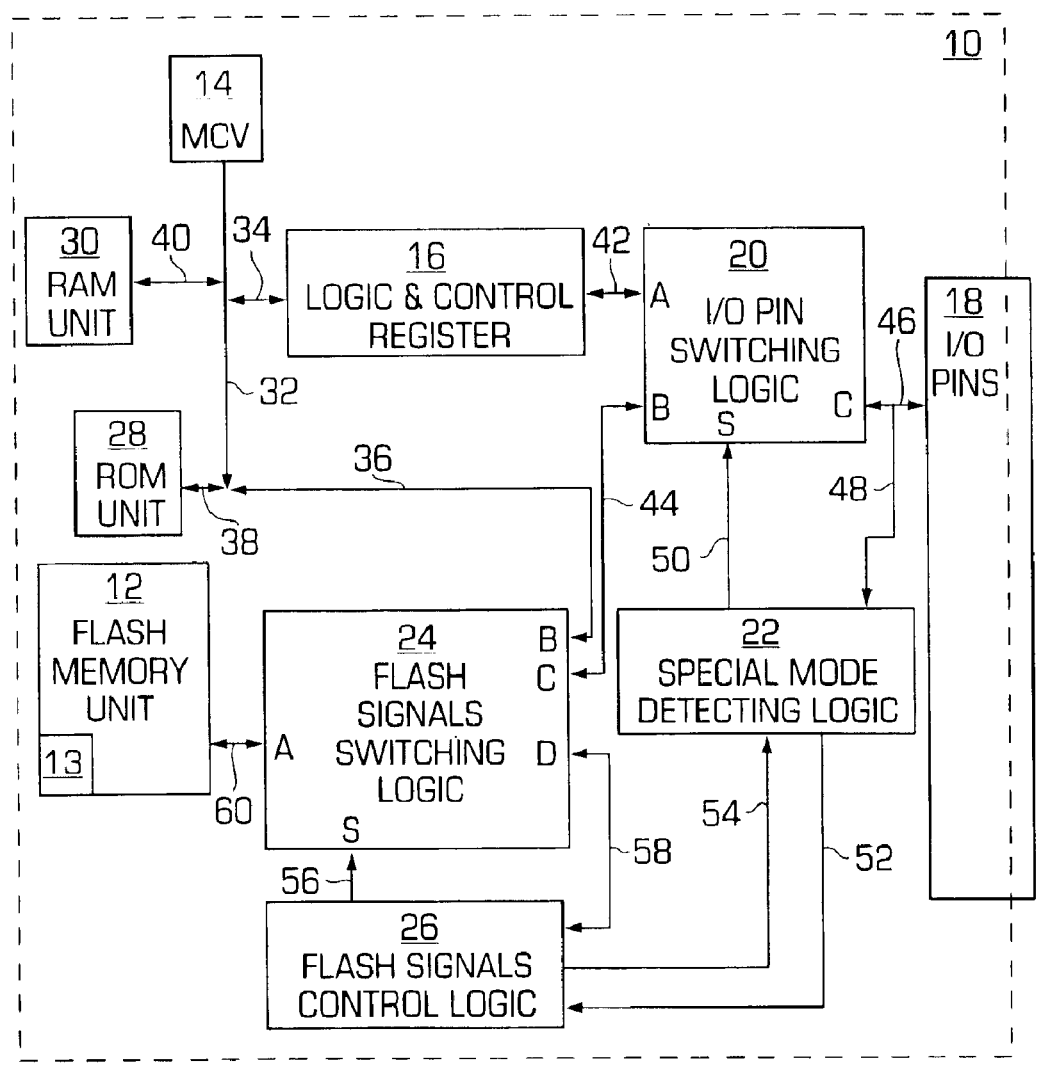
FIG. 1 is a block diagram of a microcontroller having embedded programmable non-volatile memory with read protection in accordance with a preferred embodiment of the present invention.

FIG. 1 illustrates a single integrated circuit microcontroller 10 having an embedded erasable/programmable non-volatile memory unit 12 with read protection in accordance with a preferred embodiment of the present invention. In the preferred embodiment, memory unit 12 may be a conventional flash memory array, and in alternate embodiments, unit 12 may be any other suitable type of non-volatile erasable/programmable memory. Microcontroller 10 is adapted to selectively operate in a special mode in which an external circuit can gain control of flash memory unit 12 by use of input/output pins 18 (e.g., in which pins 18 are communicatively coupled,to memory unit 12). This special mode may be activated by communicating a predetermined sequence of signals to the input/output pins 18, and allows a manufacturer to program instructional data, microcode or firmware into flash memory unit 12 (e.g., during production or in a laboratory for debugging operations) and for read back. Memory unit 12 includes a read protection flag or byte 13, which may be set during the production of the microcontroller 10 after instructional data or firmware has been installed onto memory 12.

In the preferred embodiment, microcontroller 10 includes erasable/programmable non-volatile memory unit 12, a processing unit or micro-control unit ("MCU") 14, a logic and control register circuit 16, input/output pins 18, input/output pin switching logic 20, special mode detecting logic 22, flash signals switching logic 24, and flash signals control logic 26. Microcontroller 10 may also include a conventional read-only memory ("ROM") unit 28 and a random access memory ("RAM") unit 30.

In the preferred embodiment of the invention, micro-control unit 14 includes a conventional and commercially available semiconductor processing device (e.g., a microprocessor). Micro-control unit 14 is communicatively coupled to logic and control register circuit 16 by use of data buses 32, 34, to flash signals switching logic 24 (e.g., to terminal B of circuit 24) by use of buses 32, 36, to ROM unit 28 by use of buses 32, 38, and to RAM unit 30 by use of buses 32, 40. As is well known to those of ordinary skill in the art, other buses, such as address and control buses (not shown) are also provided between the MCU 14 and the aforementioned elements. Logic and control register circuit 16 includes conventional microcontroller logic and control register circuitry which operates with micro-control unit 14 to communicate control signals to and from input/output pins 18.

Input/output pin switching logic 20 includes one or more conventional switching circuits having one or more electrical switches (e.g., transistors) that may be selectively activated in response to control signals received at a select terminal (e.g., terminal S), effective to electrically connect any connection terminal of the circuit 20 (e.g., terminal A, B or C) to a different connection terminal. In the preferred embodiment, logic 20 includes first, second and third connection terminals (i.e., terminals A, B, and C, respectively) and a select terminal (i.e., terminal S). The first terminal A is communicatively coupled to logic and control register 16 by use of bus 42, the second terminal B is communicatively coupled to flash signals switching logic 24 (i.e., to terminal C of logic 24) by use of bus 44, the third terminal C is communicatively coupled to input/output pins 18 by use of bus 46, and the select terminal S is communicatively coupled to the special mode detecting logic 22 by use of bus 50.

Special mode detecting logic 22 includes a conventional control circuit that is adapted to detect when the special mode has been activated. Signals received by the input/output pin 18 are passed on the buses 46/48 to the special mode detecting logic 22. In the preferred embodiment, logic 22 comprises one or more conventional sequencing circuits, which are adapted to detect the special mode by sensing a certain predetermined sequence of signals communicated to pins 18. In an alternate embodiment, the special mode may be detected in any other suitable manner. In one non-limiting embodiment, logic 22 comprises one or more high voltage detectors, which are adapted to detect the special mode by detecting a relatively high voltage signal communicated to pins 18. After the special mode is detected, the special mode detecting logic 22 through control bus 52 causes flash signals control logic 26 to connect the flash signal switching logic 24 to connect terminal A to terminal D. In addition, the flash signals control logic 26 causes the read protection flag 13 from the memory unit 12 to be read and the content thereof is passed to the special mode detection logic 22 along bus 54. The special mode detection logic 22 reads the read protection flag 13 and in response determines which portion of the flash memory unit 12 may be read by external access through pins 18. Thus, the special mode detection logic 22 also receives the address signals supplied from the pins 18 to bus 46. Thus special mode detection logic 22 compares the address signals from bus 46 supplied from the pins 18 to the range of address signals that are permitted to be read, as determined by the read protection flag 13. In response, the special mode detection logic connects either terminal B of I/O pin switching logic 20 to terminal C (thereby permitting the read operation at the indicated address) or connects terminal A to terminal C (prohibiting the read operation at the indicated address).

Flash signals control logic 26 is a conventional control circuit that is adapted to perform conventional memory operations on flash memory unit 12, such as read, program and erase operations. Logic 26 is further adapted to provide control signals to flash signals switching logic 24 and to special mode detecting logic 22. Flash signals control logic 26 is communicatively coupled to the select terminal S of flash signals switching logic 24 by use of bus 56, and to terminal D of logic 24 by use of bus 58.

Flash signals switching logic 24 includes one or more conventional switching circuits having one or more electrical switches (e.g., transistors) that may be selectively activated in response to control signals received at a select terminal (e.g., terminal S), effective to electrically connect any of connection terminals of the circuit 20 (e.g., terminal A, B, C or D) to a different connection terminal. In the preferred embodiment, logic 24 includes first, second, third and fourth connection terminals (i.e., terminals A, B, C, and D, respectively) and a select terminal (i.e., terminal S). The first terminal A is communicatively coupled to flash memory unit 12 by use of bus 60, the second terminal B is communicatively coupled to micro-control unit 14 by use of buses 36, 32, the third terminal C is communicatively coupled to the second terminal B of input/output switching logic 20 by use of bus 44, and the fourth terminal D is communicatively coupled to flash control logic 26 by use of bus 58.

It should be appreciated that the microcontroller 10 illustrated in FIG. 1 may further include additional and/or different circuit elements or portions which assist in the reading, programming and erasing of data from flash memory unit 12 and in the general operation of microcontroller 10, such as additional buses, memory units, pins, multiplexers, buffers, counters, shift registers, circuits and other elements necessary and/or desirable to perform memory and control operations.

In operation, external sources cannot access a read operation on the flash memory unit 12 of microcontroller 10 unless the special mode is activated. When the microcontroller 10 is not operating in the special mode, special mode detecting logic 22 communicates a signal to the select terminal S of input/output pin switching logic 20, effective to cause logic 20 to electrically connect terminal A to terminal C, and to disconnect terminals B and C. In this state, the micro-control unit 14 has access to the input/output pins 18, thereby allowing the micro-control unit 14 to transmit and receive electrical signals and data. Particularly, micro-control unit 14 has access to input/output pins 18 through the path created by buses 32, 34, 42, 46 and logic 20. Additionally, no electrical connection or path exists between pins 18 and memory unit 12, thereby preventing external sources from accessing memory unit 12 through pins 18.

Additionally, when logic 22 determines that microcontroller 10 is not operating in the special mode, it communicates a corresponding signal to flash signals control logic 26. In response to receiving a signal from logic 22 indicating that the special mode is not active, flash signals control logic 26 communicates a signal to the select terminal S of flash signals switching logic 24, effective to cause logic 24 to electrically connect terminal A to terminal B. In this manner, the micro-control unit 14 has access to the flash memory unit 12, thereby allowing the micro-control unit 14 to transmit and receive data to and from unit 12. Particularly, micro-control unit 14 has access to unit 12 through the path created by buses 32, 36, 60 and logic 24.

When logic 22 detects the special mode (i.e. read access from external), it instructs logic 24 to check the read protection flag or byte 13 in flash memory unit 12. Logic 22 maintains the connection between terminal A and terminal C (and disconnection of terminals B and C) of input/output pin switching logic 20 until the read protection byte 13 is checked. During this time, external circuits cannot gain access to unit 12 through pins 18.

In order to check the read protection byte in flash memory unit 12, control logic 26 communicates a signal to select terminal S of switching logic 24, effective to electrically connect terminal A to terminal D. In this state, control logic 26 has access to flash memory unit 12 through the path created by buses 58, 60 and logic 24. Control logic 26 then performs a read operation on the read protection flag or byte 13 in flash memory unit 12 to determine its content.

In the preferred embodiment, the flash memory unit 12 has a plurality of sectors, with the read protection flag 13 stored in the first byte of the last sector of the flash memory unit 12. The value of the read protection flag 13 and its associated meaning is as follows:

| Value | Meaning |
|---|---|
| 00H | Protect the whole array |
| 01H | Protect the last 16 sectors (2K bytes) |
| 02H | Protect the last 8 sectors (1K bytes) |
| 03H | Protect the last 4 sectors (512 bytes) |
| 04H | Protect the last 2 sectors (256 bytes) |
| 05H | Protect the last sector (128 bytes) |
| 06H to FFH | No read protection |

When the microcontroller 10 is in the special access mode, only the Ready/#Busy pin is valid and all other pins are blocked.

If the read protection flag 13 is 06H to FFH, the flash signals control logic 26 communicates a signal to terminal S of logic 24, effective to electrically connect terminal A to terminal C. The flash signals control logic 26 also informs special mode detecting logic 22 that the read protection flag or byte 13 is cleared. In response, logic 22 communicates a signal to select terminal S of input/output pin switching logic 20, effective to cause logic 20 to electrically connect terminal B to terminal C. This will electrically connect input/output pins 18 to flash memory unit 12, thereby allowing external circuits to access flash memory unit 12 to perform read, program and erase operations on unit 12. Particularly, external circuits may access flash memory unit 12 through pins 18 by the path created by buses 46, 44, 60 and logic 20, 24. In this manner, the flash memory unit 12 may be programmed at any time during or after the manufacturing process (e.g., firmware may be installed onto flash memory unit 12). When the firmware of the unit 12 is programmed, the read protection flag 13 may be set, in order to prevent external access to the embedded firmware. Alternatively, the firmware stored on unit 12 may include instructions to set the read protection flag 13 upon the occurrence of a predetermined post-processing condition.

When flash signals control logic 26 determines that the read protection byte is set (01H to 05H) during the special mode, logic 26 causes flash signals switching logic 24 to maintain the terminal A to terminal C connection.

In this embodiment, microcontroller 10 provides read protection to only a portion of memory unit 12, containing confidential firmware or instructional data. In this embodiment, special mode detecting logic 22 is further adapted to receive the addresses associated with requests to access unit 12 from external circuits through input/output pins 18, and to restrict access to memory unit 12 based on the locations of those addresses. When the special mode is detected, logic 22 will permit external circuits to access certain "unprotected" portions or addresses of unit 12 (e.g., portions that do not contain any firmware or instructional data or any firmware which does not have to be protected), depending upon the value of the read protection flag 13. Logic 22 receives memory access requests including the corresponding address signals from external circuits through input/output pins 18. When logic 22 receives external requests to access addresses within flash memory unit 12 during the special mode, it compares the requested addresses to predetermined stored values in order to determine whether the requests are for "confidential" or protected portions of memory unit 12 that store firmware or instructional data. If the address requests correspond to only unprotected locations, microcontroller 10 (e.g., logic 20–26) will electrically connect pins 18 to memory unit 12, thereby allowing external circuits to access the unprotected locations. However, if the address requests correspond to any confidential or protected portions of memory unit 12, then read operation for the protected area will not occur. In particular the pin switch logic 20 will be selected to connect its terminal A to terminal B.

Further, when the microcontroller 10 is operating in the special mode, the following operations are also permitted:

1. Erase. Erasure of the entire array or erasure of all sectors (except for the last sector where the read protection flag is stored) is permitted.
2. Programming. Programming of the unprotected sectors with read back verification is permitted. Programming within the read protected sectors is also permitted except that there is no read verification. Finally, it should be noted that any attempt to program the read protection flag 13 will actually increase the protected sectors. This is because after the flag 13 is erased (as in chip erasure), the value is FFH or "1111 1111". Any programming changes a "1" bit to "0" bit, but only an erase operation (which can only be chip erase) can change a "0" bit of the flag 13 to a "1" bit. Thus, if the flag 13 is set to 05H or "0000 0101", a program operation will change it to "0000 0001" or "0000 0100", both of which increases the size of the protected area.

Figure 2:
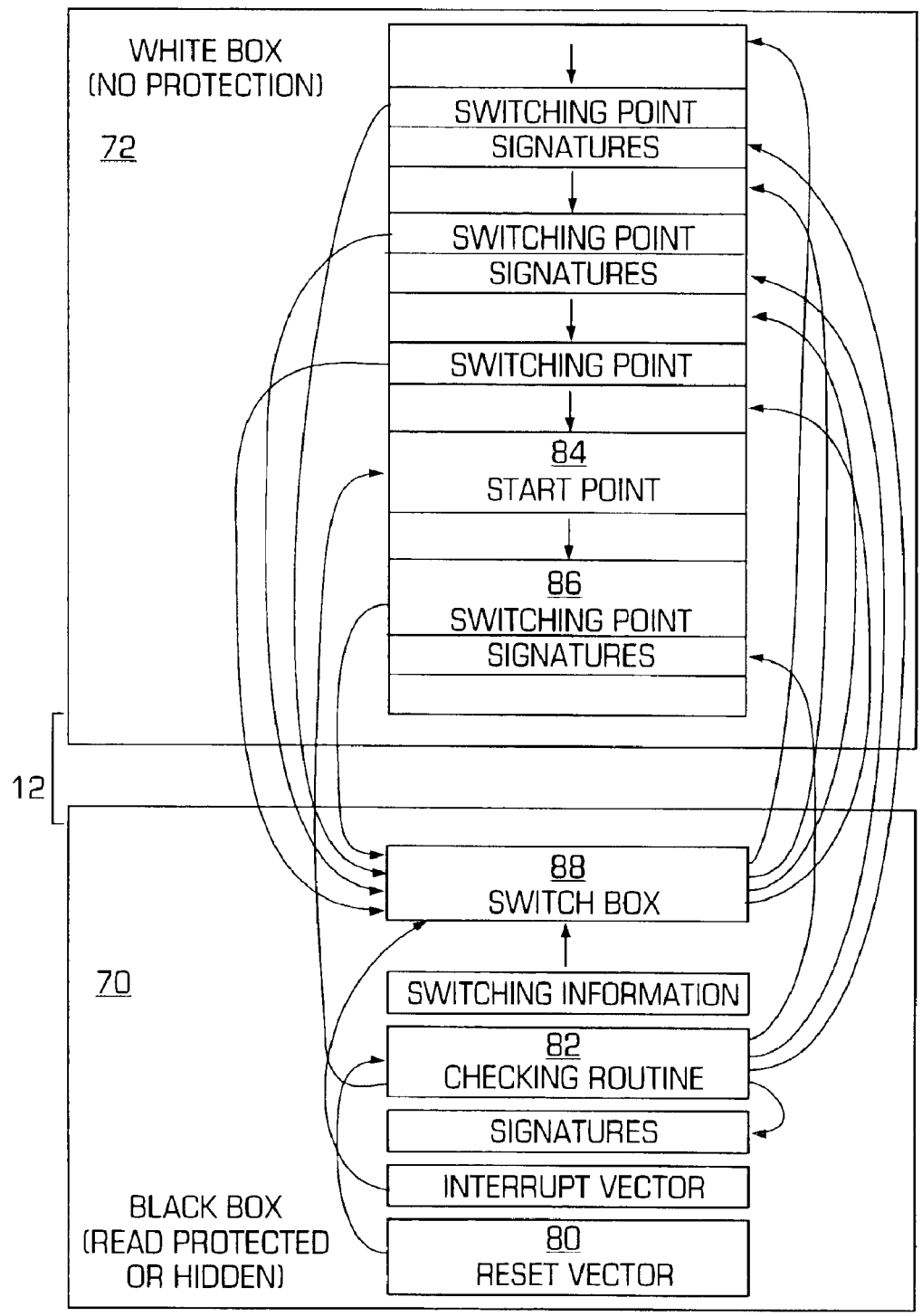
FIG. 2 is a schematic diagram of an example of software flow execution, for software that is stored in the microcontroller of the present invention.

Referring to FIG. 2, there is shown a schematic diagram of firmware stored in a flash memory unit 12 of the microcontroller 10 of the present invention used in a particular application. The flash memory unit 12 has two portions: a first portion 70 which is protected from read from external by the value set in the read protection flag 13, and an unprotected portion 72.

In one application of the microcontroller 10 of the present invention, an IP (Intellectual Property) provider, such as a firmware or software provider may choose to license its software to particular hardware makers for inclusion of the IP onto their hardware products. In order for the IP provider to be assured that its IP would not be misappropriated, the IP provider may provide the particular firmware in the protected portion 70 of the flash memory unit 12 of the microcontroller 10. However, the hardware manufacturer may desire some flexibility in the IP that the IP provider has provided. Thus, it may desire to customize the IP provided. One way to accomplish both objectives and in accordance with the present invention is for the IP provider to provide a "core" portion which is stored in the protected portion 70, and one or more modules which the hardware manufacturer chooses, which is stored in the unprotected portion 72. The firmware provided by the IP provider stored in the protected portion 70, may consist of a reset vector 80 which upon initialization of the microcontroller 10 jumps to a checking routine 82. The checking routine 82 checks the integrity of the unprotected portion 72. One way this may be done is to check the signature of the unprotected portion to authenticate that it is an authorized firmware provided by the hardware manufacturer. Other well known techniques include check sum, CRC etc. The checking routine 82 of the protected portion 70 may also check the signatures of the protected portion 70 of the flash memory unit 12. Finally, execution of the checking routine 82 may then cause execution to revert to a starting point 84 within the unprotected portion 72 of the flash memory unit 12. Execution within the unprotected portion 72 starts at the starting point 84 and continues until a first switching point 86 is encountered in which event execution may then jump back into the protected portion 70 in the program routine entitled "switch box" 88. From the switch box 88, execution may again loop back to the unprotected portion 72. This looping of the various portions at various locations that start within the unprotected portion 72 and then continuing to execution within the protected portion 70 and then looping out back to the unprotected portion 72 can continue until the entire program is executed.

In the event an unscrupulous user were to read out portions of the code stored in the flash memory unit 12, the only portion that the user can access would be the unprotected portion 72. The code read out would be bits and pieces or fragments of codes having a starting point and entry point and would be difficult to re-align these fragments into a complete code. In addition, of course, code within the protected portion 70 can never be read out. Therefore, as can be seen from the foregoing, the microcontroller 10 with the read protection capability has great utility in facilitating transfer of proprietary firmware from one source to another while maintaining its proprietariness and at the same time offering the transferee the ability to customize that firmware.

The present invention provides a single integrated circuit microcontroller 10 including embedded programmable non-volatile memory 12 having read protection. By use of the read protection flag 13, microcontroller 10 can allow external access to flash memory unit 12 during a special mode, stored in certain areas. In this manner, microcontroller 10 prevents unauthorized access to confidential data and firmware that may be stored within unit 12.

It should be understood that the inventions described herein are provided by way of example only and that numerous changes, alterations, modifications, and substitutions may be made without departing from the spirit and scope of the inventions as delineated within the following claims.

What is claimed is:

1. A single integrated circuit microcontroller comprising:
an erasable/programmable non-volatile flash memory unit, partitioned into a plurality of sectors;
a read protection flag stored in one of said plurality of sectors of said flash memory unit;
a logic portion which is adapted to detect when a read mode external to said microcontroller is activated, to check said read protection flag upon detecting said read mode, and to allow external access to read portions, if any, of said non-volatile memory unit in response to said protection flag; and
wherein said read protection flag set to one of a plurality of increasing values; and wherein said logic portion allows external access to read increasing portions of said flash memory unit in response to increasing values of said read protection flag.

2. The microcontroller of claim 1 further comprising:
at least one input/output pin, and wherein said logic portion comprises:
switching logic which is adapted to selectively connect and disconnect said at least one input/output pin to and from said non-volatile memory unit; and
control logic which is communicatively coupled to said switching logic and which is adapted to detect when said read mode is activated, to check said read protection flag upon detecting said read mode, and to determine the portion of said flash memory unit to be read, said control logic being further adapted to selectively communicate signals to said switching logic, effective to connect said at least one input/output pin to said non-volatile memory only if said read mode is activated and said portion of said flash memory unit to be read is allowed.

3. The microcontroller of claim 1 further comprising a micro-control unit which is selectively connected to said input/output pins and to said non-volatile memory unit by use of said switching logic.

4. The microcontroller of claim 3 further comprising a random access memory unit which is communicatively coupled to said micro-control unit.

5. The microcontroller of claim 3 further comprising a read-only memory unit which is communicatively coupled to said micro-control unit.

6. The microcontroller of claim 4 wherein said micro-control unit comprises a microprocessor.

7. The microcontroller of claim 1 wherein said control logic is communicatively coupled to said at least one input/output pin and is adapted to detect said read mode upon sensing a predetermined sequence of signals communicated to said at least one input/output pin.

8. A single integrated circuit microcontroller comprising:
an erasable/programmable non-volatile memory unit including a first portion adapted to store certain firmware, said memory unit partitioned into a plurality of sectors;
a read protection flag stored in one of said plurality of sectors of said non-volatile memory unit;
a logic portion which is adapted to detect when a read mode external to said microcontroller is activated, to check said read protection flag upon detecting said read mode, and to allow external access to read portions of said non-volatile memory unit other than said first portion; and
wherein said read protection flag is set to one of a plurality of increasing values; and wherein said logic portion allows external access to read increasing portions of said non-volatile memory unit in response to increasing values of said read protection flag.

9. The microcontroller of claim 8 further comprising:
erase circuit for erasing all of said first portion of said non-volatile memory unit.

10. The microcontroller of claim 9 further comprising:
programming circuit for reprogramming said read protection flag without first erasing said read protection flag; and
wherein said reprogrammed read protection flag allows external access to read portions of said non-volatile memory unit other than a second portion which is greater than said first portion.

11. A method for providing read protection for a microcontroller including an embedded programmable non-volatile memory unit having a first portion that stores certain firmware, and a read mode in which said programmable non-volatile memory unit is externally accessible, said method comprising the steps of:
storing a read protection flag, set to one of a plurality of increasing values, in said microcontroller;
detecting when said read mode is activated;
checking said read protection flag when said read mode is activated; and
allowing external access to read increasing portions of said memory unit in response to increasing values of said read protection flag.

* * * * *